US012399259B2

(12) United States Patent
Ta et al.

(10) Patent No.: US 12,399,259 B2
(45) Date of Patent: Aug. 26, 2025

(54) LIGHT-RECEIVING APPARATUS AND ELECTRONIC DEVICE

(71) Applicant: KABUSHIKI KAISHA TOSHIBA, Tokyo (JP)

(72) Inventors: Tuan Thanh Ta, Kawasaki Kanagawa (JP); Akihide Sai, Yokohama Kanagawa (JP); Toshiki Sugimoto, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1050 days.

(21) Appl. No.: 17/187,524

(22) Filed: Feb. 26, 2021

(65) Prior Publication Data

US 2022/0057492 A1    Feb. 24, 2022

(30) Foreign Application Priority Data

Aug. 24, 2020    (JP) .................... 2020-141187

(51) Int. Cl.
    *G01C 3/08*      (2006.01)
    *G01S 7/481*     (2006.01)
    *G01S 7/4863*    (2020.01)
    *G01S 7/487*     (2006.01)

(52) U.S. Cl.
    CPC .......... *G01S 7/4863* (2013.01); *G01S 7/4816* (2013.01); *G01S 7/4873* (2013.01)

(58) Field of Classification Search
    CPC ..... G01S 7/4863; G01S 7/4818; G01S 7/4873
    See application file for complete search history.

(56) References Cited

U.S. PATENT DOCUMENTS

| 6,934,012 | B2 | 8/2005 | Inaba et al. |
| 7,262,402 | B2 | 8/2007 | Niclass et al. |
| 7,671,391 | B2 | 3/2010 | Kawahito |
| 7,858,917 | B2 | 12/2010 | Stern et al. |
| 7,897,906 | B2 | 3/2011 | Deschamps |
| 8,410,416 | B2 | 4/2013 | Eldesouki et al. |
| 8,859,944 | B2 | 10/2014 | Eldesouki et al. |
| 9,201,138 | B2 | 12/2015 | Eisele et al. |

(Continued)

FOREIGN PATENT DOCUMENTS

| EP | 3415950 A1 * | 12/2018 | ........... G01S 7/4865 |
| JP | 2002-324909 A | 11/2002 | |

(Continued)

OTHER PUBLICATIONS

Japan Patent office, Decision to Grant a Patent in JP App. No. 2023-146503, 1 page, and machine translation, 2 pages (Aug. 16, 2024).

(Continued)

*Primary Examiner* — Mark Hellner
(74) *Attorney, Agent, or Firm* — Finnegan, Henderson, Farabow, Garrett & Dunner, LLP (57) ABSTRACT

A light-receiving apparatus has M (M is greater than 2) light-receiving elements corresponding to one pixel, and controller circuitry configured to control a bias voltage of the M light-receiving elements in accordance with a condition that the number of light-receiving elements of the M light-receiving elements simultaneously detecting light within a first period is less than N (N is an integer equal to or greater than 2 and less than M).

20 Claims, 10 Drawing Sheets

(56) References Cited

U.S. PATENT DOCUMENTS

| | | | |
|---|---|---|---|
| 9,234,964 B2 | 1/2016 | Mheen et al. | |
| 9,269,846 B2 | 2/2016 | Yao | |
| 9,823,353 B2 | 11/2017 | Eichenholz et al. | |
| 10,151,837 B2 | 12/2018 | Sigmund et al. | |
| 10,222,475 B2 | 3/2019 | Pacala et al. | |
| 10,304,877 B2 | 5/2019 | Mellot et al. | |
| 10,338,224 B2 | 7/2019 | Eken et al. | |
| 10,361,334 B2 | 7/2019 | McIntosh et al. | |
| 10,983,197 B1* | 4/2021 | Zhu | G01S 17/10 |
| 11,411,130 B2 | 8/2022 | Azuma et al. | |
| 2012/0162373 A1 | 6/2012 | Mheen et al. | |
| 2018/0180470 A1 | 6/2018 | Seitz | |
| 2018/0180473 A1 | 6/2018 | Clemens et al. | |
| 2019/0239753 A1* | 8/2019 | Wentz | G01J 3/2803 |
| 2020/0348416 A1* | 11/2020 | Sakaguchi | G01S 17/10 |

FOREIGN PATENT DOCUMENTS

| | | |
|---|---|---|
| JP | 2014-81254 A | 5/2014 |
| JP | 2015-78953 A | 4/2015 |
| JP | 2017-3489 A | 1/2017 |
| JP | 2018-182051 A | 11/2018 |
| JP | 2019-190892 A | 10/2019 |
| WO | WO 2019/203057 A1 | 10/2019 |
| WO | WO 2020/103805 A1 | 5/2020 |

OTHER PUBLICATIONS

Japan Patent Office, Office Action in JP App. No. 2024-081219, 3 pages, and machine translation, 5 pages (Jan. 7, 2025).

* cited by examiner

LIGHT-RECEIVING APPARATUS AND ELECTRONIC DEVICE

CROSS REFERENCE TO RELATED APPLICATIONS

This application is based upon and claims the benefit of priority from the prior Japanese Patent Application No. 2020-141187, filed on Aug. 24, 2020, the entire contents of which are incorporated herein by reference.

FIELD

An embodiment of the present disclosure relates to a light-receiving apparatus and an electronic device.

BACKGROUND

In an automatic drive or the like, use of a time of flight (ToF) sensor is common in order to measure the distance to an object. The ToF sensor measures the distance by the time difference between the time when the light-projecting unit projects light and the time when the light from the light-projecting unit reflected by the object is received.

When the object is located at a distance, the light intensity of the reflected light from the object becomes weak, and hence it is necessary to increase the sensitivity of the light-receiving apparatus. By operating in Geiger mode using an avalanche photodiode as a light-receiving apparatus, it is possible to obtain a highly sensitive light-receiving apparatus capable of detecting faint light.

However, if the sensitivity of the light-receiving apparatus is increased, ambient light such as sunlight is detected, and there is a possibility that accurate distance measurement cannot be performed.

DETAILED DESCRIPTION

According to a light-receiving apparatus has M (M is greater than 2) light-receiving elements corresponding to one pixel, and controller circuitry configured to control a bias voltage of the M light-receiving elements in accordance with a condition that the number of light-receiving elements of the M light-receiving elements simultaneously detecting light within a first period is less than N (N is an integer equal to or greater than 2 and less than M).

Embodiments of the light-receiving apparatus and the electronic device will be described below with reference to the drawings. In the following description, the main components of the light-receiving apparatus and the electronic device will be mainly described, but the light-receiving apparatus and the electronic device can have components and functions not shown or described. The following description does not exclude components or functions not shown or described.

First Embodiment

Figure 1:
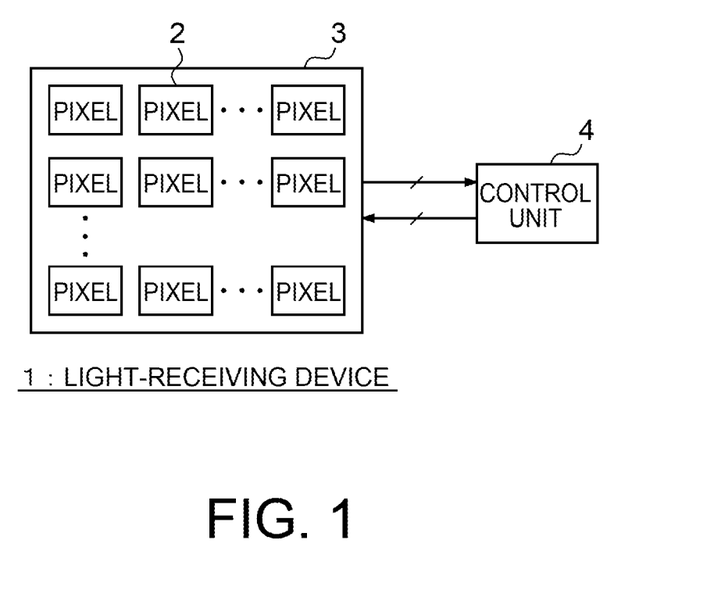
FIG. 1 is a block diagram showing a schematic configuration of a light-receiving apparatus according to a first embodiment.

FIG. 1 is a block diagram showing a schematic configuration of the light-receiving apparatus 1 according to a first embodiment. As will be described later, the light-receiving apparatus 1 of FIG. 1 is used to receive reflected light from an object, for example. The light-receiving apparatus 1 of FIG. 1 includes a light-receiving unit 3 having a plurality of pixels 2 arranged in a one-dimensional or two-dimensional direction, and a control unit (controller circuitry) 4.

Figure 2:
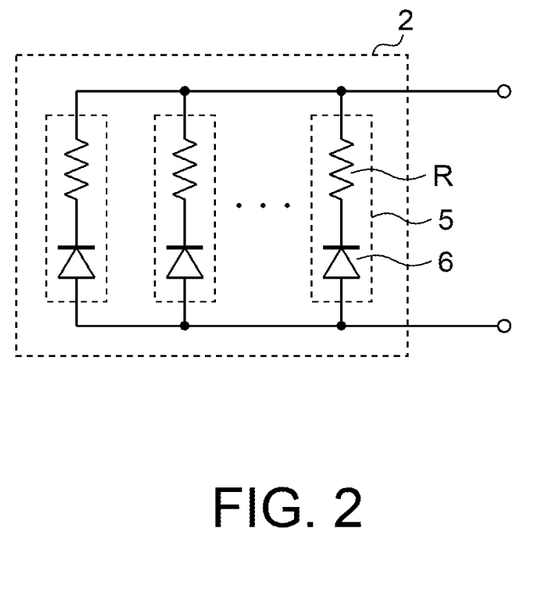
FIG. 2 is a circuit diagram showing an internal configuration of pixels in the light-receiving apparatus 1 of FIG. 1.

FIG. 2 is a circuit diagram showing an internal configuration of the pixels 2 in the light-receiving apparatus 1 of FIG. 1. As shown in FIG. 2, each pixel 2 in the light-receiving unit 3 has a plurality of light-receiving elements 5 connected in parallel. Each light-receiving element 5 has a resistance element R and a single photon avalanche diode (SPAD) 6 connected in series between a first node and a second node. The present embodiment assumes that the SPAD 6 is operated in Geiger mode. This allows each light-receiving element 5 to output an electric signal obtained by photoelectrically converted of one received photon. In the present description, it is sometimes referred to as ignition that the light-receiving element 5 detects one photon and outputs an electric signal. Once ignited, the light-receiving element 5 requires a reset operation, and cannot detect new light until the reset operation is completed. The period from the ignition of the light-receiving element 5 to the next ignitable state is also called dead time.

FIG. 2 only shows one example of the configuration of the light-receiving element 5, and does not limit the configuration of the light-receiving element 5. For example, an active quench circuit for controlling the SPAD 6 using an active element instead of the resistor R may be used. A configuration as shown in FIG. 2 where a plurality of light-receiving elements 5 are arranged in parallel and each terminal is connected is also an example, and also a method for connecting the light-receiving elements 5 in parallel is not limited. For example, the output of the SPAD 6 may be converted into a signal of a digital region in the light-receiving element 5, and the outputs of the plurality of light-receiving elements 5 may be added in the digital region to obtain the output of the pixel 2.

Since the pixel 2 of FIG. 2 has the plurality of light-receiving elements 5, it is also called a silicon photomultiplier (SiPM). Hereinafter, an example in which the number of the light-receiving elements 5 included in one pixel 2 is M (M is an integer equal to or greater than 2) will be described.

The light-receiving element 5 is driven in the Geiger mode by applying a bias voltage higher than the breakdown voltage of the SPAD 6 to the cathode of the SPAD 6 that is the light-receiving element 5. By controlling the bias voltage applied to the SPAD 6, the sensitivity of the SPAD 6 can be adjusted.

The control unit 4 shown in FIG. 1 controls the bias voltage of the M light-receiving elements 5 in the pixel 2 in accordance with a condition that the number of light-receiving elements of the M light-receiving elements simultaneously detecting light within a first period is less than N (N is an integer equal to or greater than 2 and less than M). That is, the control unit 4 controls the bias voltage of the M light-receiving elements 5 in the pixel 2 so that equal to or greater than a threshold value N light-receiving elements 5 (N is an integer equal to or greater than 2 and less than M) of the M light-receiving elements 5 do not simultaneously detect light within a predetermined period. Thus, since the control unit 4 adjusts the bias voltage so that only less than N light-receiving elements 5 in the pixel 2 simultaneously detect light in the first period, there is no risk that the light-receiving elements 5 are saturated in the first period, and the distance to the object can be accurately measured.

The first period is, for example, a period shorter than an irradiation interval in which the light-projecting unit not shown in FIG. 1 irradiates the object with light. More specifically, for example, when distance measurement is performed, the first period is set to a period including a timing at which reflected light from the object is received.

Each of the M light-receiving elements needs an elapse of dead time from when light is detected to when next light is detectable. The number of light-receiving elements of the M light-receiving elements simultaneously detecting light within the first period is counted by the number of light-receiving elements simultaneously belonging to the dead time within the first period.

Figure 3:
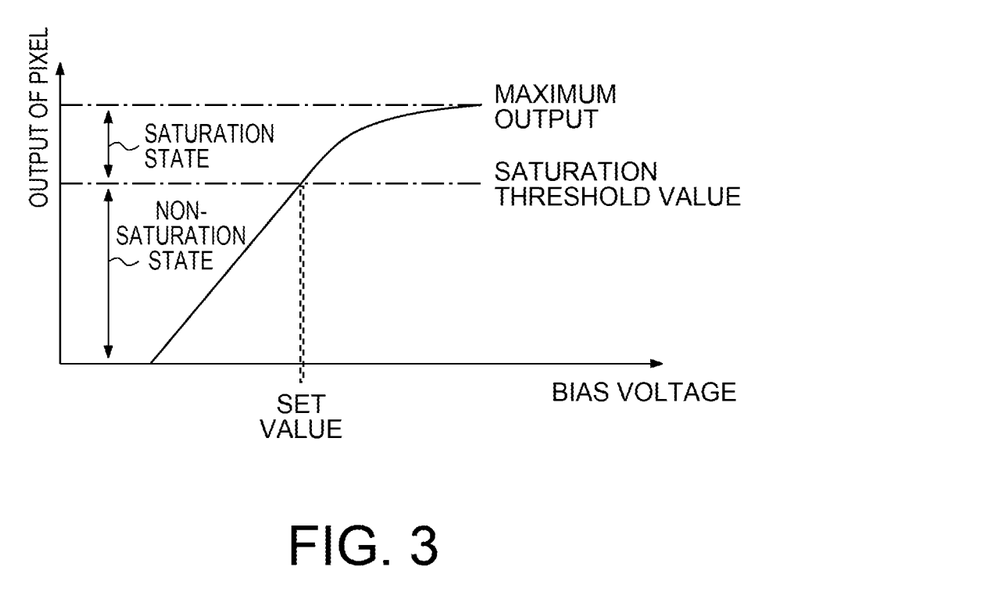
FIG. 3 is a view showing characteristics of a light-receiving unit.

FIG. 3 is a view showing characteristics of the light-receiving unit 3. In FIG. 3, the horizontal axis represents the bias voltage of the light-receiving element 5 in each pixel 2, and the vertical axis represents the output of each pixel 2. In the present embodiment, the SPAD 6 that operates in the Geiger mode is assumed as the light-receiving element 5, and when each SPAD 6 detects light, it cannot detect new light during the subsequent dead time period. Therefore, when all the SPADs 6 in the pixel 2 detect light, no more light can be received, and this state is called a saturation state. The saturation state corresponds to the maximum output of FIG. 3. When each pixel 2 is brought into the saturated state, new light cannot be received for a while, and hence the bias voltage of each light-receiving element 5 needs to be adjusted so that each pixel 2 is not brought into the saturation state.

The output of the pixel 2 on the vertical axis in FIG. 3 represents the number of the light-receiving elements 5 having detected light among the M light-receiving elements 5 in the pixel 2. As illustrated, by changing the bias voltage of the light-receiving element 5, the output of each pixel 2 can be changed. The characteristic curve of FIG. 3 is a linear region in which the output of the pixel 2 changes substantially linearly during a period in which the bias voltage is low, and when the bias voltage becomes high, most of the light-receiving elements 5 detect light, and hence the degree of change in the output of the pixel 2 becomes gentle. The slope of the linear region of the characteristic curve of FIG. 3 is determined by ambient light such as sunlight, manufacturing variation of the light-receiving element 5, temperature, crosstalk between the light-receiving elements 5, and the like.

As the bias voltage of the light-receiving element 5 is increased, the sensitivity of the light-receiving element 5 is improved and even weak light can be received. However, on the other hand, ambient light such as sunlight can be easily detected, and the proportion of noise included in the electric signal photoelectrically converted by the light-receiving element 5 increases. The SPAD 6 sometimes outputs an electric signal that becomes noise even without receiving light. In particular, when the sensitivity of the SPAD 6 is increased, noise tends to increase. Furthermore, a phenomenon called crosstalk in which another SPAD 6 ignites can occur due to the influence of the ignition of surrounding SPADs 6. On the other hand, when the bias voltage of the light-receiving element 5 is lowered, sensitivity is lowered and weak light cannot be detected.

Therefore, it is desirable to set the bias voltage of the light-receiving element 5 as high as possible to an extent that the pixel 2 is not saturated. Therefore, as shown by a broken line in FIG. 3, the control unit 4 of the present embodiment sets a threshold value (also called a saturation threshold) for the output of the pixel 2 to adjust the bias voltage of each light-receiving element 5 in the pixel 2 so that the output of the pixel 2 does not exceed the threshold value within the first period. The present description assumes that bias voltages of the identical voltage level are applied to all the light-receiving elements 5 in one pixel 2.

The control unit 4 sets the first period so as to include a period in which light emitted by the light-projecting unit is reflected by the object and received by the light-receiving element 5, and sets the bias voltage so that the number of light-receiving elements 5 that detect light within the set first period does not exceed the threshold value. This allows reflected light from the object to be received by the light-receiving unit 3 filly, and the accuracy of distance measurement to be improved.

The control unit 4 may individually control the bias voltage for each pixel 2 when there is a plurality of pixels 2 arranged in the one-dimensional or two-dimensional direction. This is because there may be a difference in light-detection characteristics for each pixel 2.

As described above, in the first embodiment, the bias voltage of each light-receiving element 5 in the pixel 2 is adjusted so that the output of the pixel 2 is not saturated, and hence reflected light from the object can be received fully, and it becomes less susceptible to ambient light such as sunlight.

Second Embodiment

The light-receiving apparatus 1 according to the second embodiment includes the same block configuration as that of FIG. 1, but the operation of the control unit 4 is different from that of the first embodiment. While the pixel 2 according to the first embodiment is provided with at least two light-receiving elements 5, the pixel 2 according to the present embodiment is only required to include one or more light-receiving elements 5. Hereinafter, the pixel 2 is assumed to have M (M is an integer equal to or greater than 1) light-receiving elements 5.

The control unit 4 according to the present embodiment controls the bias voltage of the M light-receiving elements 5 so that the total value of the number of times the M light-receiving elements 5 detect light within the first period does not become equal or greater than a predetermined threshold value. That is, the control unit 4 controls the bias voltage of each light-receiving element 5 so that the number of the light-receiving elements 5 that detect light in the pixel 2 within the first period becomes less than the threshold value.

The first period is a period longer than an irradiation interval at which the light-projecting unit irradiates the object with light. In the present embodiment, it is assumed that a plurality of times of light are received, and for example, a first period is set within a period in which light is projected intermittently for a plurality of times from a light-projecting unit, and the light of the plurality of times is reflected by the object and sequentially received.

Thus, in the present embodiment, since the light-receiving element 5 is assumed to receive light a plurality of times, only one light-receiving element 5 in the pixel 2 is sufficient. The bias voltage of the light-receiving element 5 can be controlled on the basis of the result that one light-receiving element 5 receives light a plurality of times. When the plurality of light-receiving elements 5 are provided in the pixel 2, the bias voltage of the light-receiving elements 5 can be controlled on the basis of the result of light-reception for a plurality of times by the light-receiving elements 5.

The threshold value is set to a value in which all the light-receiving elements 5 in the pixel 2 do not detect light within the first period. The control unit 4 controls the bias voltage of each light-receiving element 5 so that the number of the light-receiving elements 5 that receive light within the first period becomes less than the threshold value, and hence there is no risk of failing to receive light from the object, and the distance to the object can be measured with high accuracy.

The control unit 4 may individually control the bias voltage on the basis of a plurality of light reception results for each pixel 2 when there is a plurality of pixels 2 arranged in the one-dimensional or two-dimensional direction. This is because there may be a difference in light-detection characteristics for each pixel 2.

Thus, in the second embodiment, since the bias voltage of each light-receiving element 5 in the pixel 2 is controlled on the basis of the result of light-reception by the light-receiving unit 3 a plurality of times. Hence, for example, when the distance to the object is measured on the basis of the light-receiving result of the plurality of times, the problem that the output of the pixel 2 is saturated in the middle of distance measurement does not occur, and the distance measurement can be performed with high accuracy.

Third Embodiment

The light-receiving apparatus 1 according to the third embodiment includes the same block configuration as that of FIG. 1, but the operation of the control unit 4 is different from that of the first and second embodiments.

The pixel 2 according to the third embodiment has M (M is an integer equal to or greater than 1) light-receiving elements 5. The control unit 4 controls the bias voltages of the M light-receiving elements 5 in the pixel 2 so that the output of the pixel 2 in the first period does not become equal or greater than a predetermined threshold value.

The control unit 4 controls the bias voltage of each light-receiving element 5 in the pixel 2 so that the output of the pixel 2 in the first period becomes equal to or less than the threshold value indicated by the broken line in FIG. 2. The length of the first period is not particularly limited.

According to the third embodiment, the saturation of the output in the pixel 2 can be prevented by adjusting the bias voltage of each light-receiving element 5 in the pixel 2.

Fourth Embodiment

The fourth embodiment relates to a processing operation of the control unit 4 according to the first to third embodiments described above. More specifically, the fourth embodiment relates to a specific method for determining whether or not the pixel 2 is saturated.

Figure 4:
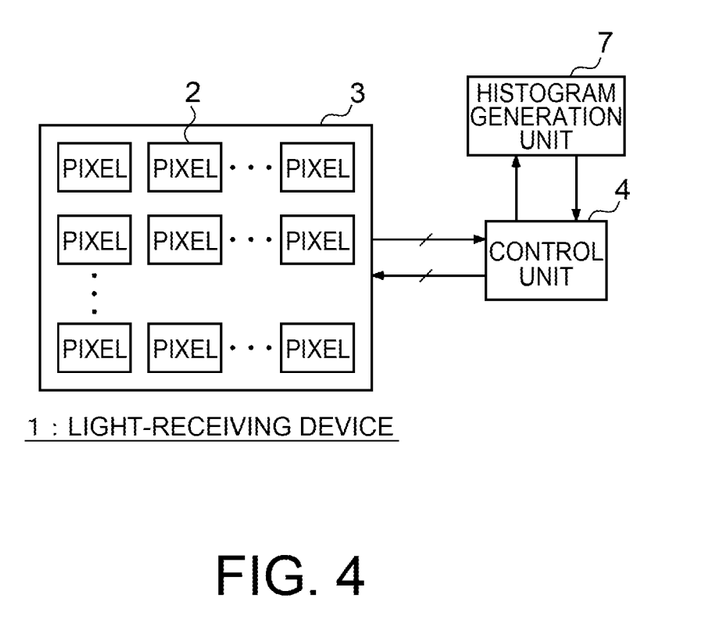
FIG. 4 is a block diagram in which a histogram generation unit is added to the light-receiving apparatus of FIG. 1.

FIG. 4 is a block diagram in which a histogram generation unit 7 is added to the light-receiving apparatus 1 of FIG. 1. The histogram generation unit 7 generates a histogram representing the relationship between the number of the light-receiving elements 5 having successfully detected light from among the M light-receiving elements 5 in the first period and the appearance frequency of the number. The light-projecting unit not shown in FIG. 4 repeatedly projects light at predetermined time intervals, and hence the histogram generation unit 7 generates a histogram by the light-projecting unit projecting light for a plurality of times and the light-receiving apparatus 1 receiving the reflected light in which the projected light is reflected by the object.

Figure 5:
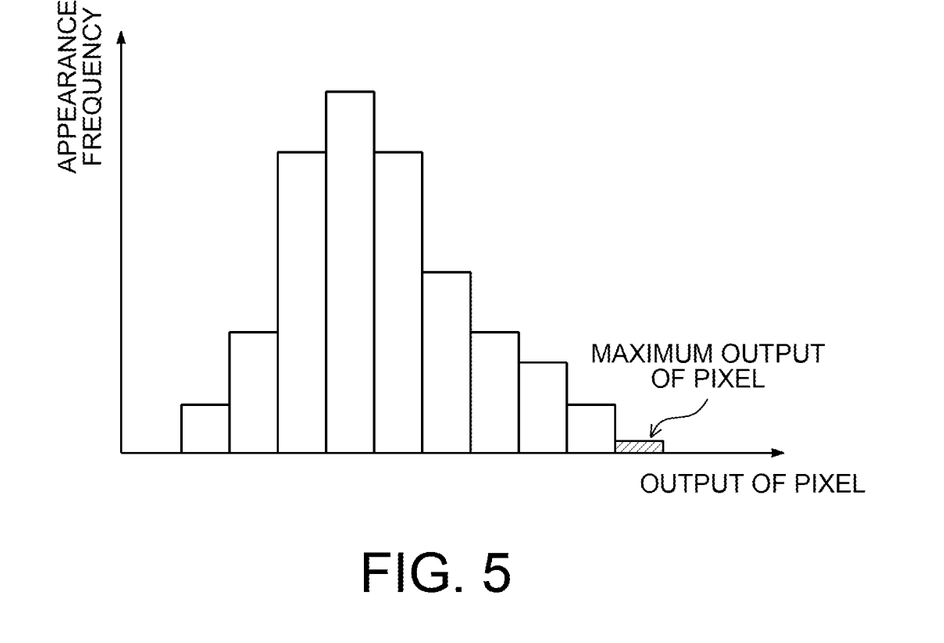
FIG. 5 is a view showing an example of a histogram generated by the histogram generation unit.

FIG. 5 is a view showing an example of a histogram generated by the histogram generation unit 7. In FIG. 5, the horizontal axis represents the output of the pixel 2, and the vertical axis represents the appearance frequency. The output of pixel 2 on the horizontal axis refers to the number of the light-receiving elements 5 having detected light. The appearance frequency on the vertical axis is sometimes called the appearance probability.

The control unit 4 sets the bias voltage so that the appearance frequency when the number of the light-receiving elements 5 having detected the light from among the M light-receiving elements 5 becomes the maximum becomes equal to or less than a predetermined value on the basis of the histogram generated by the histogram generation unit 7.

The signal received by the light-receiving element 5 includes both reflected light from the object and ambient light. Since reflected light from the object is originally light that should be received, the output of the pixel 2 when the reflected light from the object is received needs to be maximized. That is, at the timing when the reflected light from the object is not received, the output of the pixel 2 must not be maximized. Therefore, the control unit 4 obtains the average and variance of the output of the pixels 2 within a predetermined period on the basis of the histogram, calculates the probability that the output of the pixels 2 is maximized, judges that the output of the pixels 2 is not saturated if the probability is equal to or less than a predetermined value, and judges that the output of the pixels 2 is saturated if the probability is greater than the predetermined value. When having judged that the output of the pixels 2 is saturated, the control unit 4 lowers the bias voltage so that the probability that the output of the pixel 2 is maximized becomes equal to or less than a predetermined value.

It should be noted that the control unit 4 may set the bias voltage so that the appearance frequency of the output of the pixel 2 slightly deviated from the maximum output of the pixel 2 in the histogram shown in FIG. 5 becomes equal to or less than a predetermined value in consideration of manufacturing variations of the light-receiving apparatus 1.

In order to generate a histogram as in FIG. 5, light projection and light reception for a plurality of times are required, and it takes time. Therefore, a histogram is created in advance, a threshold value is set on the basis of the histogram, whether or not the output of the pixel 2 has been saturated is judged by whether or not the average output of the pixel 2 in the first period exceeds the threshold value, and when it is judged that the output of the pixel 2 has been saturated, the bias voltage may be adjusted.

The control unit 4 detects the maximum output of the pixel 2 within the first period without using the histogram, and may judge that the pixel 2 is not saturated if the maximum output of the pixel 2 is less than a predetermined threshold value, and may judge that the pixel 2 has been saturated if the maximum output of the pixel 2 is equal to or greater than the threshold value. In this case, the control unit 4 sets the bias voltage of the light-receiving element 5 so that the maximum output of the pixel 2 in the first period does not exceed the threshold value. In this method, since the control unit 4 only has to monitor the maximum output of the pixel 2, the processing operation of the control unit 4 becomes easy, and for example, when the control unit 4 is configured by hardware, the circuit scale can be reduced.

Thus, in the fourth embodiment, the bias voltage of the light-receiving element 5 in which the output of the pixel 2 is not saturated can be set relatively easily by using the histogram showing the correspondence between the output of the pixel 2 and the appearance frequency. Even if a histogram is not used, monitoring the maximum output of the pixel 2 allows the bias voltage to be set so that the maximum output of the pixel 2 becomes equal to or less than a threshold value.

Fifth Embodiment

In the fifth embodiment, the bias voltage is set by a method different from that of the fourth embodiment. The light-receiving apparatus 1 according to the fifth embodiment includes the same block configuration as that of FIG. 1, but the processing operation of the control unit 4 is different from that of the fourth embodiment.

Figure 6:
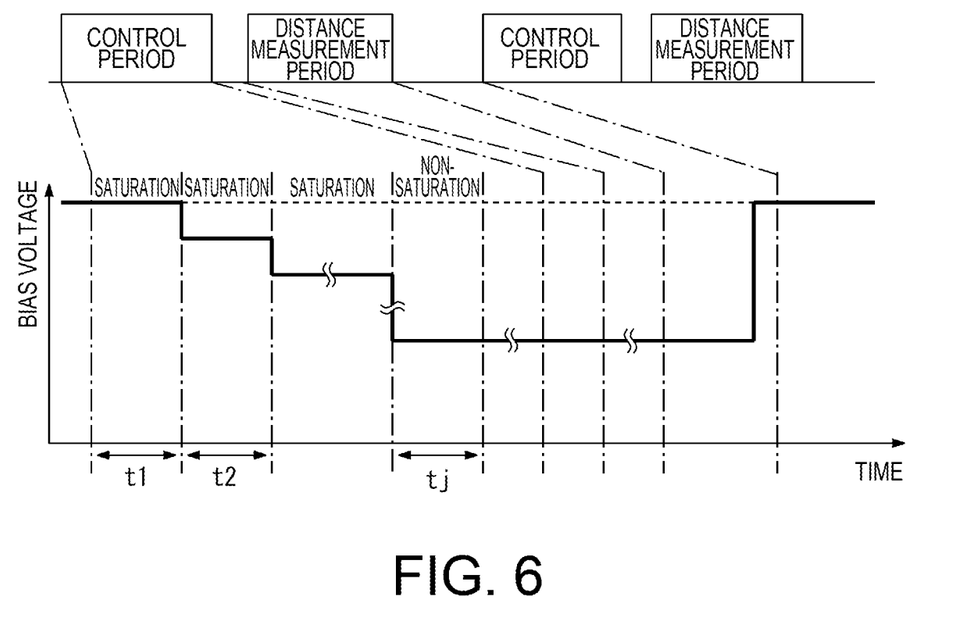
FIG. 6 is a view showing an example in which the bias voltage of the light-receiving element is sequentially lowered from the initial voltage over a plurality of times.

The control unit 4 according to the fifth embodiment searches for an optimum bias voltage by sequentially changing the bias voltage from the initial voltage over a plurality of times. FIG. 6 is a view showing an example in which the bias voltage of the light-receiving element 5 is sequentially (stepwise) lowered from the initial voltage over a plurality of times. In FIG. 6, the horizontal axis represents a time for applying the bias voltage to the light-receiving element 5, and the vertical axis represents the bias voltage. In a period t1, the bias voltage is set to an initial voltage V0, and in a period t2, the bias voltage is set to a voltage V1, which is one step lower than the initial voltage V0, and thereafter, the bias voltage is lowered stepwise over a plurality of times for each predetermined period. The initial voltage of the bias voltage set in the period t1 is the voltage that is applied to the maximum in the control period, and if the pixel is not saturated even with this bias, the larger bias cannot be applied.

The control unit 4 detects whether or not the light-receiving element 5 is saturated when the bias voltage is applied to the light-receiving element 5. By sequentially lowering the bias voltage in a stepwise manner from the initial voltage, the number of light-receiving elements 5 that detect light is reduced. For example, when M (M is an integer equal to or greater than 2) light-receiving elements 5 exist in the pixel 2, the control unit 4 sets a threshold value to when N (N is an integer equal to or greater than 1 and less than M) light-receiving elements 5 among them detect light, and sets the bias voltage at that time to each light-receiving element 5 in the pixel 2.

As shown in FIG. 6, by counting the number of light-receiving elements 5 that detect light in the pixel 2 while lowering stepwise the bias voltage, the bias voltage of each light-receiving element 5 in the pixel 2 can be set in accordance with the detection of light by a predetermined number of light-receiving elements 5 in the pixel 2.

In FIG. 6, in addition to the control period in which the bias voltage is set while lowering stepwise the bias voltage, a distance measurement period for measuring the distance to the object is provided. The control period is provided between the distance measurement periods.

Although FIG. 6 shows an example in which the bias voltage is lowered stepwise from the initial voltage, the bias voltage may be increased stepwise from the initial voltage. It is assumed that the initial voltage in this case is the minimum voltage applied in the control period and that a smaller bias is not applied when the pixel is saturated even with this bias.

When having lowered stepwise the bias voltage from the initial voltage over a plurality of times, the control unit 4 may set the bias voltage that satisfies a condition of the threshold value for the first time, and may stop subsequent change processing of the bias voltage. Alternatively, when raising stepwise the bias voltage from the initial voltage over a plurality of times and when having not satisfied a condition of the threshold value for the first time, the control unit 4 may set the bias voltage immediately before, and may stop subsequent change processing of the bias voltage.

The control unit 4 may change the bias voltage stepwise every time the light-projecting unit intermittently irradiates light. Alternatively, the control unit 4 may change the bias voltage stepwise every time the light-projecting unit irradiates light a plurality of times.

The voltage width when changing the bias voltage may be the same or different. The bias voltage may be changed in accordance with a constant voltage pattern. The voltage pattern in this case does not necessarily have to be a voltage pattern that monotonically increases or monotonically decreases, and may be a voltage pattern in which the voltage level changes irregularly (e.g., random). Alternatively, the bias voltage may be dynamically changed by a binary search method or the like to set the maximum bias voltage at which the pixel 2 is not saturated.

The bias search method is performed by the following processing procedure, for example. First, whether or not the output of the pixel 2 is saturated with the maximum settable bias voltage A and the minimum settable bias voltage B is compared, and if the output is not saturated with the bias voltage A, the bias voltage A is made the setting value of the bias voltage. If the output is saturated with the bias voltage B, the bias voltage B is made the setting value of the bias voltage. If the output is saturated with the bias voltage A and is not saturated with the bias voltage B, it is examined whether or not the output of the pixel 2 is saturated with the bias voltage C=(A+B)/2. If the output is saturated with the bias voltage C, the saturation state is examined with a bias voltage in between the bias voltage C and the bias voltage B. If the output is not saturated with the bias voltage C, the saturation state is examined with a bias voltage in between the bias voltage C and the bias voltage A. By repeating the comparison processing of such saturation state, the error between the actual setting value and the ideal setting value of the bias voltage can be reduced in inverse proportion to the 2 to the power of the number of processing steps.

When measuring the distance to the object, the control unit 4 controls the bias voltage of the light-receiving element 5 in the pixel 2, but it is not always necessary to control the bias voltage every time the distance measurement is performed, and for example, the bias voltage may be adjusted at a rate of once a plurality of times of distance measurements.

Figure 7:
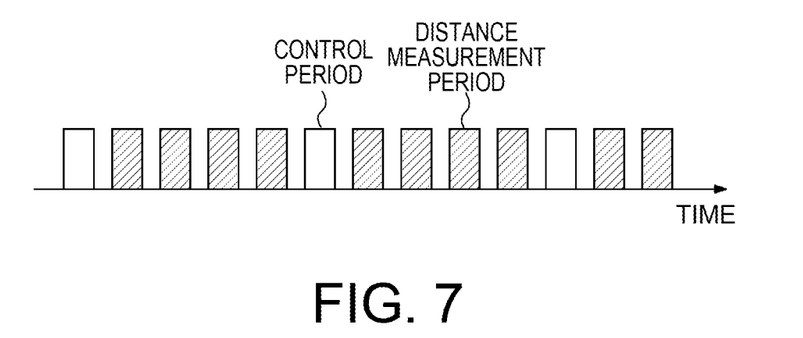
FIG. 7 is a view showing a first example of the timing of the control period for adjusting the bias voltage and the distance measurement period for measuring the distance.

FIG. 7 is a view showing the first example of the timing of the control period for adjusting the bias voltage and the distance measurement period for measuring the distance. In the first example of FIG. 7, the control period for adjusting the bias voltage is provided at a rate of once after the distance measurement period for measuring the distance is provided four times consecutively. How frequent the bias voltage is adjusted is optional. In FIG. 7, the bias voltage is adjusted at regular intervals, but the bias voltage may be adjusted irregularly.

Figure 8:
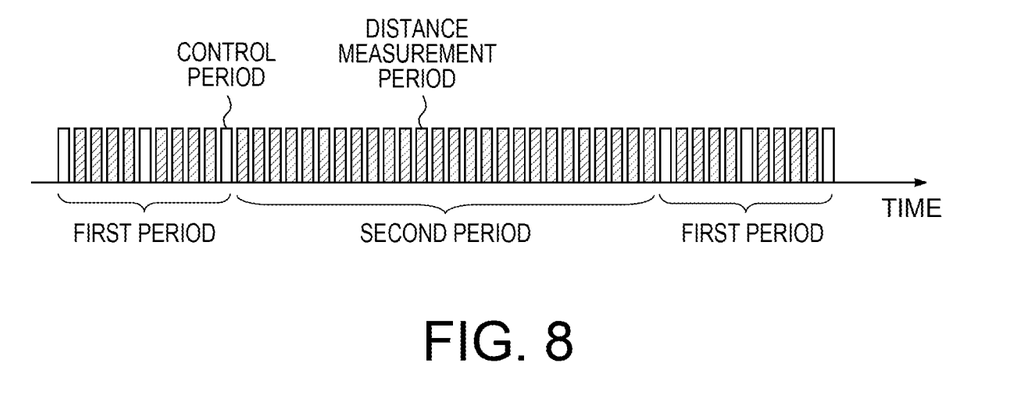
FIG. 8 is a view showing a second example of the adjustment timing of the bias voltage and the distance measurement timing.

FIG. 8 is a view showing the second example of the adjustment timing of the bias voltage and the distance measurement timing. In the second example of FIG. 8, the first period and the second period are alternately arranged, and in the first period, the control period is provided at a rate of once a plurality of distance measurement periods are provided consecutively, as in FIG. 7. In the second period, only the distance measurement period is provided. The time lengths of the first period and the second period are optional, and the time lengths of the first period and the second period may change irregularly.

Thus, in the fifth embodiment, the optimum bias voltage can be set relatively easily because the number of the light-receiving elements 5 that detect light in the pixel 2 becomes equal to or less than the threshold value while changing stepwise the bias voltage.

Since the timing at which the bias voltage is adjusted can be set optionally, the bias voltage can be adjusted regularly or irregularly at a timing that does not interfere with the distance measurement.

Sixth Embodiment

Figure 9:
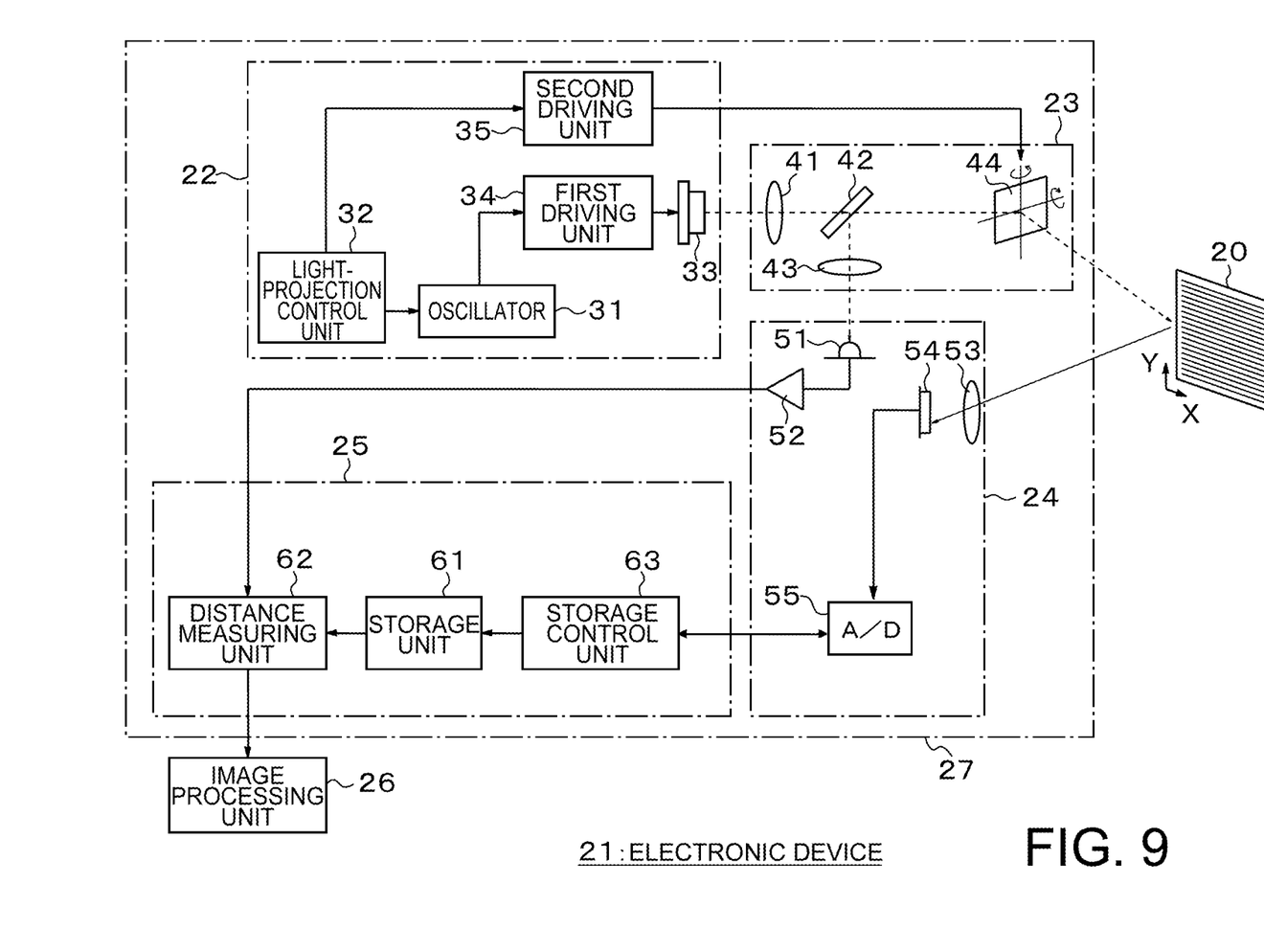
FIG. 9 is a block diagram showing a schematic configuration of an electronic device including a light-receiving module incorporating a light-receiving apparatus according to the present embodiment.

The light-receiving apparatus 1 according to the above-described first to fifth embodiments can be incorporated in an electronic device that performs ToF distance measurement. FIG. 9 is a block diagram showing a schematic configuration of an electronic device 21 including a light-receiving module 24 incorporating the light-receiving apparatus 1 according to the present embodiment. The electronic device 21 of FIG. 9 includes a light-projecting unit 22, a light-control unit 23, the light-receiving module 24, a signal processing unit 25, and an image processing unit 26. Of them, the light-projecting unit 22, the light-control unit 23, the light-receiving module 24, and the signal processing unit 25 constitute a distance measurement device 27. The light-receiving apparatus 1 according to the above-described first to fifth embodiments is implemented as at least a part of the light-receiving module 24.

At least a part of the electronic device 21 of FIG. 1 can be configured with one or a plurality of semiconductor integrated circuits (ICs). For example, the signal processing unit 25 and the image processing unit 26 may be integrated inside a single semiconductor chip, or may be integrated into this semiconductor chip together with the light-receiving module 24. They may be integrated into this semiconductor chip inclusive of the light-projecting unit 22.

The light-projecting unit 22 projects the first light. The first light is a laser beam of a predetermined frequency band, for example. The laser beam is a coherent light having the same phase and frequency. The light-projecting unit 22 intermittently projects the pulse-like first light at a predetermined cycle. The cycle in which the light-projecting unit 22 projects the first light is a time interval equal to or longer than the time required for measuring the distance by the distance measurement device 27 on the basis of one pulse of the first light.

The light-projecting unit 22 has an oscillator 31, a light-projection control unit 32, a light source 33, a first driving unit 34, and a second driving unit 35. The oscillator 31 generates an oscillation signal in accordance with a cycle of projecting the first light. The first driving unit 34 intermittently supplies electric power to the light source 33 in synchronization with the oscillation signal. The light source 33 intermittently emits the first light on the basis of the electric power from the first driving unit 34. The light source 33 may be a laser element emitting a single laser beam or a laser unit simultaneously emitting a plurality of laser beams. The light-projection control unit 32 controls the second driving unit 35 in synchronization with the oscillation signal. The second driving unit 35 supplies a driving signal synchronized with the oscillation signal to the light-control unit 23 in response to an instruction from the light-projection control unit 32.

The light-control unit 23 controls the traveling direction of the first light emitted from the light source 33. The light-control unit 23 controls the traveling direction of the second light having been received.

The light-control unit 23 has a first lens 41, a beam splitter 42, a second lens 43, and a scanning mirror 44.

The first lens 41 collects the first light emitted from the light-projecting unit 22 and guides it to the beam splitter 42. The beam splitter 42 splits the first light from the first lens 41 in two directions, and guides it to the second lens 43 and the scanning mirror 44. The second lens 43 guides the split light from the beam splitter 42 to the light-receiving module 24. The reason for guiding the first light to the light-receiving module 24 is to detect the light-projection timing by the light-receiving module 24.

The scanning mirror 44 rotationally drives the mirror surface in synchronization with the driving signal from the second driving unit 35 in the light-projecting unit 22. This controls the reflection direction of the split light (first light) having passed through the beam splitter 42 and entered the mirror surface of the scanning mirror 44. By rotationally driving the mirror surface of the scanning mirror 44 at a constant cycle, the first light emitted from the light-control unit 23 can be scanned at least in the one-dimensional direction. By providing the axes for rotationally driving the mirror surface in two directions, the first light emitted from the light-control unit 23 can be scanned in the two-dimensional direction. FIG. 1 shows an example in which the scanning mirror 44 scans in the X and Y directions the first light projected from the electronic device 21.

If an object 20 is present within the scanning range of the first light projected from the electronic device 21, the first light is reflected by the object 20. At least part of the reflected light reflected by the object 20 travels reversely along the substantially identical path as that of the first light and enters the scanning mirror 44 in the light-control unit 23. The mirror surface of the scanning mirror 44 is rotationally driven at a predetermined cycle. However, since the laser beam propagates at the speed of light, the reflected light from the object 20 enters the mirror surface while the angle of the mirror surface of the scanning mirror 44 hardly changes. The reflected light from the object 20 having entered the mirror surface is received by the light-receiving module 24.

The light-receiving module 24 has a photodetector 51, an amplifier 52, a third lens 53, a light-receiving sensor 54, and an A/D converter 55. The photodetector 51 receives the light split by the beam splitter 42 and converts it into an electric signal. The photodetector 51 can detect the light-projection timing of the first light. The amplifier 52 amplifies the electric signal output from the photodetector 51.

The third lens 53 forms an image of the laser beam reflected by the object 20 on the light-receiving sensor 54. The light-receiving sensor 54 receives the laser beam and converts it into an electric signal. As the light-receiving sensor 54, the light-receiving apparatus 1 according to the above-described first to fifth embodiments can be applied. The light-receiving sensor 54 is also called a silicon photomultiplier (SiPM).

The A/D converter 55 samples the electric signal output from the light-receiving sensor 54 at a predetermined sampling rate and performs A/D conversion to generate a digital signal.

The signal processing unit 25 measures the distance to the object 20 by which the first light is reflected, and stores the digital signal in accordance with the second light in a storage unit 61. The signal processing unit 25 includes the storage unit 61, a distance measuring unit 62, and a storage control unit 63.

The distance measuring unit 62 measures the distance to the object 20 on the basis of the first light and reflected light. More specifically, the distance measuring unit 62 measures the distance to the object on the basis of the time difference between the light-projection timing of the first light and the light-reception timing of the reflected light included in the second light received by the light-receiving sensor 54. That is, the distance measuring unit 62 measures the distance on the basis of the following expression (1).

Distance=Speed of light×(Light-reception timing of reflected light−Light-projection timing of first light)/2 (1)

The "Light-reception timing of reflected light" in the expression (1) is more accurately the light-reception timing of the peak position of the reflected light. The distance measuring unit 62 detects the peak position of the reflected light included in the second light on the basis of the digital signal generated by the A/D converter 55.

Figure 10:
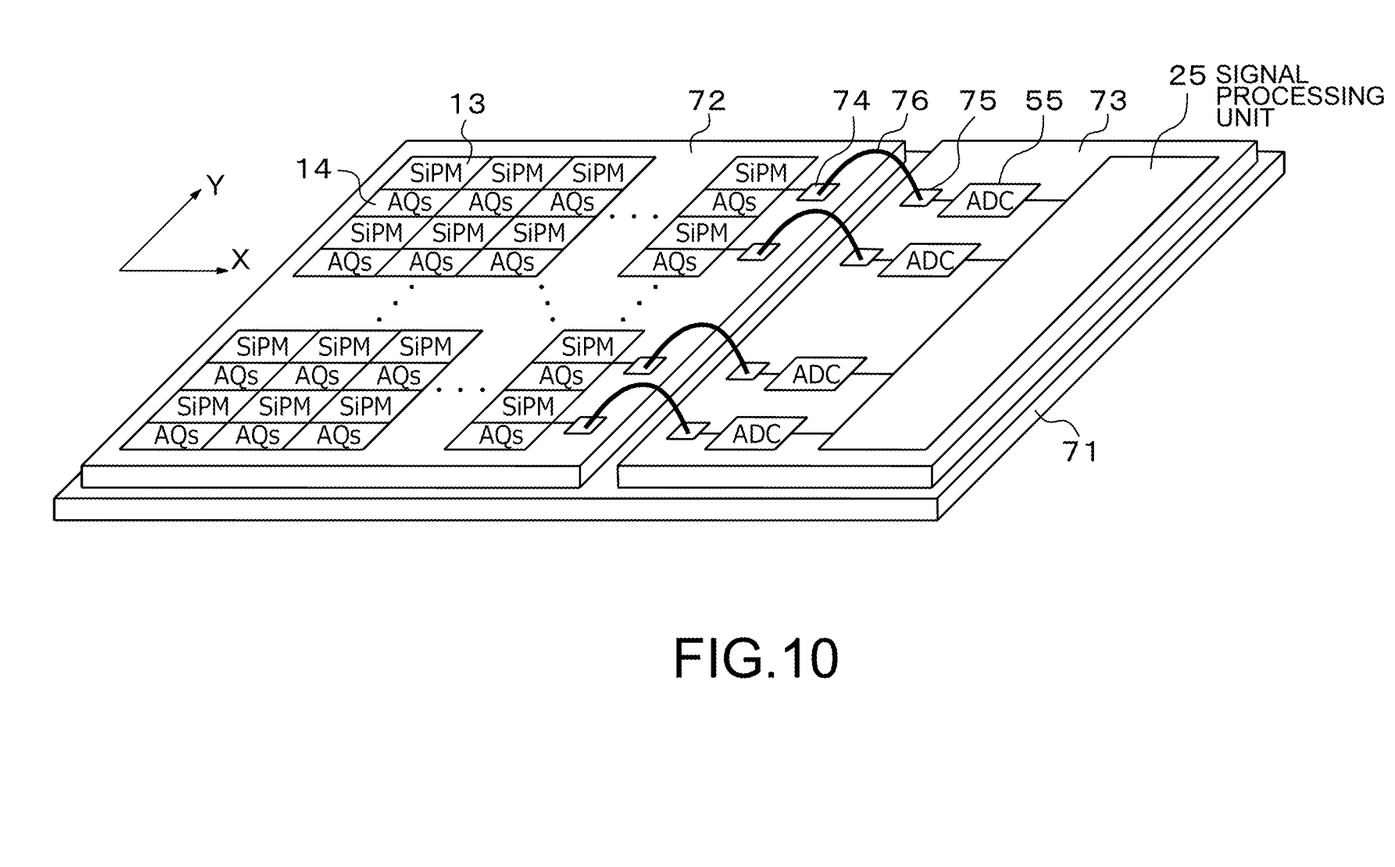
FIG. 10 is a schematic perspective view showing an example in which a light-receiving module and a signal processing unit are implemented on a substrate of a package.

At least a part of the electronic device 21 according to the present embodiment can be implemented by a silicon in package (SiP). FIG. 10 is a schematic perspective view showing an example in which the light-receiving module 24 and the signal processing unit 25 are implemented on a substrate of a package. On a substrate 71 of FIG. 10, a first die 72 and a second die 73 are provided. On the first die 72, the light-receiving sensor 54 in the light-receiving module 24 of FIG. 1 is arranged. The light-receiving sensor 54 is a SiPM 74 having the light-receiving apparatus 1 according to the above-described first to fourth embodiments. A plurality of the SiPMs 74 are arranged in the X direction and the Y direction, respectively. On the second die 73, the A/D converter (ADC) 55 in the light-receiving module 24 of FIG. 1 and the signal processing unit 25 are arranged. A pad 76 on the first die 72 and a pad 77 on the second die 73 are connected by a bonding wire 78.

In the layout view of FIG. 10, the plurality of SiPMs 74 are arranged on the first die 72, but an active quench circuit and a passive quench circuit (AQs) for shortening the dead time of the APD may be arranged in association with each SiPM 74.

While certain embodiments have been described, these embodiments have been presented by way of example only, and are not intended to limit the scope of the disclosures. Indeed, the novel methods and systems described herein may be embodied in a variety of other forms; furthermore, various omissions, substitutions and changes in the form of the methods and systems described herein may be made without departing from the spirit of the disclosures. The accompanying claims and their equivalents are intended to cover such forms or modifications as would fall within the scope and spirit of the disclosures.

The invention claimed is:

1. A light-receiving apparatus comprising:
   M (M is greater than 2) light-receiving elements corresponding to one pixel; and
   controller circuitry configured to perform, in a control period, a process for controlling a bias voltage of the M light-receiving elements in accordance with a condition that the number of light-receiving elements of the M light-receiving elements simultaneously detecting light within a first period is less than N (N is an integer equal to or greater than 2 and less than M) and that the M light-receiving elements operate in a non-saturation state, wherein
   the M light-receiving elements detect, in a distance measurement period after the control period, light projected by a light-projector by using the bias voltage controlled by the controller circuitry in the control period, the M light-receiving elements being used for measuring a distance based on a time difference between a time when the light-projector projects the light and a time when light reflected by an object is received by the M light-receiving elements.

2. The light-receiving apparatus according to claim 1, wherein
   the first period is shorter than an irradiation interval in which a light-projector irradiates an object with light.

3. The light-receiving apparatus according to claim 1, wherein
   each of the M light-receiving elements needs an elapse of dead time from when light is detected to when next light is detectable, and
   the number of light-receiving elements of the M light-receiving elements simultaneously detecting light within the first period is counted by the number of light-receiving elements simultaneously belonging to the dead time within the first period.

4. A light-receiving apparatus comprising:
   M (M is greater than 1) light-receiving elements corresponding to one pixel; and
   controller circuitry configured to perform, in a control period, a process for controlling a bias voltage of the M light-receiving elements in accordance with a condition that a total value of the number of times the M light-receiving elements detect light within a first period does not become equal or greater than a predetermined threshold value and that the M light-receiving elements operate in a non-saturation state, wherein
   the M light-receiving elements detect, in a distance measurement period after the control period, light projected by a light-projector by using the bias voltage controlled by the controller circuitry in the control period, the M light-receiving elements being used for measuring a distance based on a time difference between a time when the light-projector projects the light and a time when light reflected by an object is received by the M light-receiving elements.

5. The light-receiving apparatus according to claim 4, wherein
   the first period is a period longer than an irradiation interval in which a light-projector irradiates an object with light.

6. A light-receiving apparatus comprising:
   M (M is an integer equal to or greater than 1) light-receiving elements corresponding to one pixel; and
   controller circuitry configured to perform, in a control period, a process for controlling a bias voltage of the M light-receiving elements in accordance with a condition that an output of the pixel in a first period does not become equal or greater than a predetermined threshold value and that the M light-receiving elements operate in a non-saturation state, wherein the M light-receiving elements detect, in a distance measurement period after the control period, light projected by a light-projector by using the bias voltage controlled by the controller circuitry in the control period, the M light-receiving elements being used for measuring a distance based on a time difference between a time when the light-projector projects the light and a time when light reflected by an object is received by the M light-receiving elements.

7. The light-receiving apparatus according to claim 1, wherein the light-receiving element has a characteristic that once detecting light, the light-receiving element does not detect new light during a dead time period in accordance with a circuit of the pixel.

8. The light-receiving apparatus according to claim 1, wherein the light-receiving element is an avalanche photodiode operating in Geiger mode.

9. The light-receiving apparatus according to claim 1, comprising:

a histogram generator configured to generate a histogram representing a relationship between the number of light-receiving elements having detected light among the M light-receiving elements in the first period and an appearance frequency of the number, wherein the controller circuitry sets the bias voltage in accordance with a condition that an appearance frequency when the number of light-receiving elements having detected light among the M light-receiving elements is maximized becomes equal to or less than a predetermined value, on a basis of the histogram.

10. The light-receiving apparatus according to claim 1, wherein the controller circuitry sets the bias voltage in accordance with a condition that a maximum number of light-receiving elements having detected light among the M light-receiving elements in the pixel becomes equal to or less than a predetermined value.

11. The light-receiving apparatus according to claim 1, wherein the controller circuitry searches for the bias voltage that is optimum by changing the bias voltage from a predetermined initial voltage over a plurality of times.

12. The light-receiving apparatus according to claim 11, wherein the controller circuitry searches for the bias voltage that is optimum by lowering stepwise the bias voltage from the initial voltage over a plurality of times.

13. The light-receiving apparatus according to claim 12, wherein when having lowered stepwise the bias voltage from the initial voltage over a plurality of times, the controller circuitry sets the bias voltage that satisfies a condition of a threshold value for a first time, and stops subsequent change processing of the bias voltage.

14. The light-receiving apparatus according to claim 11, wherein the controller circuitry searches for the bias voltage that is optimum by raising stepwise the bias voltage from the initial voltage over a plurality of times.

15. The light-receiving apparatus according to claim 14, wherein when raising stepwise the bias voltage from the initial voltage over a plurality of times and when having not satisfied a condition of the threshold value for a first time, the controller circuitry sets the bias voltage immediately before, and stops subsequent change processing of the bias voltage.

16. The light-receiving apparatus according claim 11, wherein the controller circuitry changes the bias voltage stepwise every time a light-projector intermittently irradiates light.

17. The light-receiving apparatus according to claim 11, wherein the controller circuitry changes the bias voltage stepwise every time a light-projector irradiates light a plurality of times.

18. The light-receiving apparatus according to claim 17, comprising:

a plurality of the pixels arranged in a one-dimensional or two-dimensional direction, wherein the controller circuitry is capable of controlling the bias voltage for each of the plurality of pixels.

19. An electronic apparatus comprising:

the light-receiving apparatus according to claim 1 that receives second light in which first light is reflected by an object;

an AD converter configured to generate a digital signal corresponding to a light-receiving signal received by the light-receiving apparatus;

a storage configured to store the digital signal; and a distance measurer configured to measure a distance to the object on a basis of light-projection timing of the first light and light-reception timing of the second light in the light-receiving apparatus.

20. The electronic apparatus according to claim 19, further comprising:

a light-projector that projects the first light, wherein the distance measurer acquires light-projection timing of the first light.

* * * * *